Aug. 6, 1929.  J. P. THÉRIAULT  1,723,900
CUSPIDOR FOR VEHICLES
Filed March 30, 1928
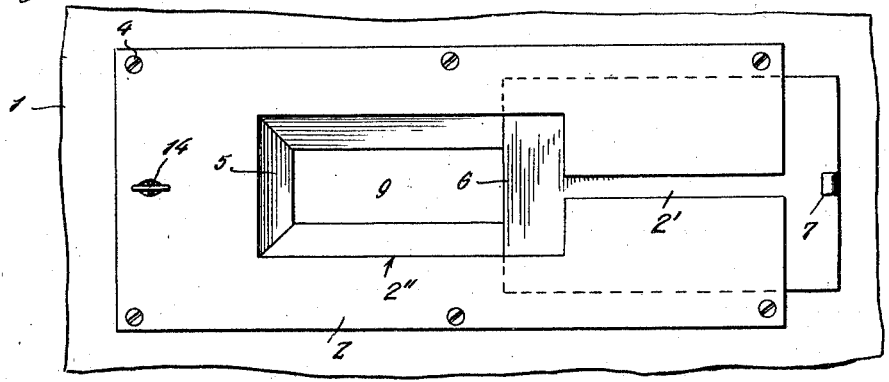
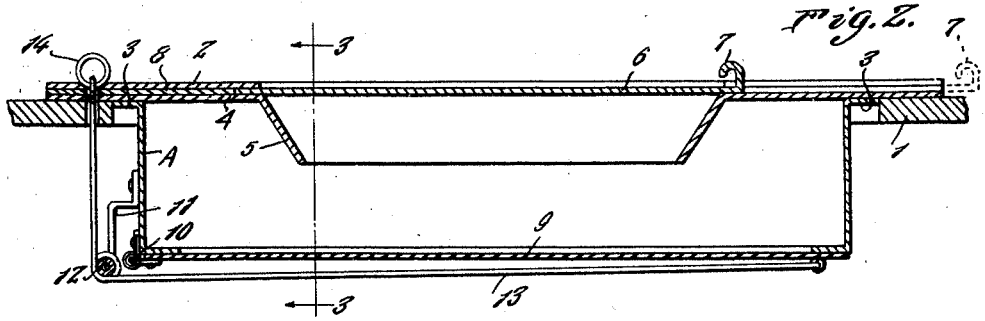
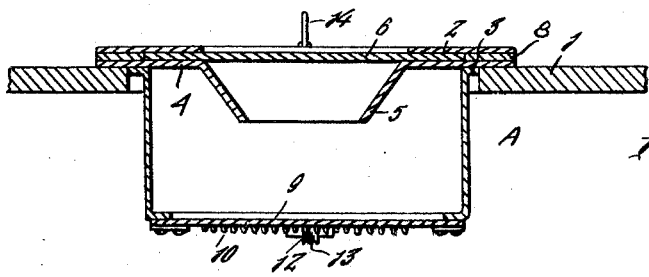
J. P. Theriault
INVENTOR
BY Victor J. Evans
ATTORNEY Patented Aug. 6, 1929.

1,723,900

UNITED STATES PATENT OFFICE.

JOSEPH PHILIPPE THÉRIAULT, OF RIMOUSKI, QUEBEC, CANADA.

CUSPIDOR FOR VEHICLES.

Application filed March 30, 1928. Serial No. 266,094.

This invention relates to a cuspidor for vehicles, such as automobiles or steam cars. The invention consists in a water-proof casing of metal or other water-proof material, flanged at the top with a detachable mounting in a recess in the floor bottom of a vehicle and open at the bottom with a hinge, normally biased by a coil spring toward closing position. On the open top is seated a sliding cover, preferably mounted in slotted ends of the casing to permit shifting to opening and closing position. The spring biased bottom is provided with a flexible connection, guided over a sheave mounted on a bracket fastened at the bottom and secured at the other end to a handle or ring pull by which it may be pulled upwardly to open the bottom to dispose of waste or expectorated matter. A device of this kind, mounted in the floor of a vehicle, will prove of great convenience to the traveling public, in which the disposal of waste, especially expectorated matter, ordinarily requires a waste receptacle or cuspidor, in which obnoxious matter is commonly received and requires frequent cleaning, whereas with the cuspidor of my construction, no cleaning would be required, except at long intervals.

The invention will be more fully hereinafter described and will be definitely indicated in the claim appended in this specification.

In the drawings accompanying the application:—

Figure 1 is a plan of a cuspidor embodying my improvements.

Figure 2 is a longitudinal mediate section.

Figure 3 is a cross section on the plane 3—3 of Figure 2.

Referring now in detail to the drawings, Figure 1 is a broken view illustrating the application of my cuspidor to the floor of a vehicle, such as an automobile. The numeral 1 represents the floor of the vehicle, in which a rectangular or round hole is made to receive a similarly formed open casing A of metal or the like and which is provided with the flanges 3 to which is secured a top plate 4 having a central opening therein which is surrounded by an inwardly and downwardly extending flange 5. A plate 2 is placed over the plate 4 and is held in spaced relation thereto by the side strips 8, these strips and the plate 2 being suitably connected to the plate 4. The plate 2 is formed with a central opening 2″ which registers with the opening in plate 4 and with a slot 2′ which extends from one end of the opening 2″ through one end of the plate. Thus the plates 2 and 4 form guideways for a sliding lid or cover 6 which is provided with a handle 7 by which it may be moved back and forth to cover and uncover the opening in the top plate 4. The handle operates through the slot 2′. The bottom of the casing carries a hinged lid 9, normally biased to closing position by a coil spring 10. On a bracket 11, mounted on the side of the casing, at one end, is mounted a roller or sheave 12 to guide a flexible connection or cord 13, one end of which is fixed to the free end of the hinged bottom 9, while the other end passes through an opening in the floor to a handle or a ring 14, by which the hinged bottom may be opened or closed.

It is apparent that the details and shape of the cuspidor may be varied without departing from the invention, which is only limited by any equivalent construction falling within the scope of my claim.

Having thus described my invention, what I claim as new and desire to secure by Letters Patent is:—

A vehicle cuspidor comprising a casing, a cover plate for the same having a centrally arranged opening therein, a downwardly and inwardly extending flange surrounding the opening, spacer strips on the plate, a second plate covering the top plate and supported in spaced relation therefrom by the spacer strips, said second plate having an opening therein registering with the opening in the top plate and a slot extending from one end of the opening through the end of the plate, a sliding cover arranged between the two plates for covering the opening in the top plate and a handle on the cover extending through the slot.

In testimony whereof, I affix my signature.

JOSEPH PHILIPPE THÉRIAULT.